(12) United States Patent
Wallace et al.

(10) Patent No.: US 7,740,128 B2
(45) Date of Patent: Jun. 22, 2010

(54) METHOD FOR SELF-SYNCHRONIZING A CONVEYOR BELT SENSOR SYSTEM

(75) Inventors: Jack Bruce Wallace, Powell, OH (US); John James Gartland, Delaware, OH (US)

(73) Assignee: Veyance Technologies, Inc., Fairlawn, OH (US)

( * ) Notice: Subject to any disclaimer, the term of this patent is extended or adjusted under 35 U.S.C. 154(b) by 415 days.

(21) Appl. No.: 11/269,786

(22) Filed: Nov. 8, 2005

(65) Prior Publication Data

US 2007/0102264 A1   May 10, 2007

(51) Int. Cl.
*B65G 35/00* (2006.01)

(52) U.S. Cl. .............. 198/618; 198/810.01; 198/810.02

(58) Field of Classification Search ................ 198/618, 198/810.01, 810.02, 502.1, 810.03; 340/676
See application file for complete search history.

(56) References Cited

U.S. PATENT DOCUMENTS

| | | | | |
|---|---|---|---|---|
| 3,602,360 A * | 8/1971 | Halbach et al. | ........ | 198/810.02 |
| 3,636,436 A * | 1/1972 | Kurauchi et al. | ............. | 324/226 |
| 3,651,506 A * | 3/1972 | Olaf et al. | .................. | 340/676 |
| 3,656,137 A * | 4/1972 | Ratz | ........................ | 340/676 |
| 3,731,113 A * | 5/1973 | Lowe et al. | ............ | 198/810.02 |
| 3,742,477 A | 6/1973 | Enabnit | ...................... | 340/259 |
| 3,792,459 A * | 2/1974 | Snyder | .................. | 198/810.02 |
| 3,831,161 A * | 8/1974 | Enabnit | ....................... | 340/507 |
| 3,834,518 A * | 9/1974 | Specht et al. | .......... | 198/810.02 |
| 3,834,524 A * | 9/1974 | Ratz et al. | .............. | 198/810.02 |
| 3,899,071 A * | 8/1975 | Duffy | ..................... | 198/810.02 |
| 3,922,661 A * | 11/1975 | Enabnit et al. | ......... | 198/810.02 |
| 4,017,826 A * | 4/1977 | Enabnit | ...................... | 340/448 |
| 4,087,800 A * | 5/1978 | Lee | ............................ | 340/676 |
| 4,228,513 A * | 10/1980 | Doljack | .................. | 198/810.02 |
| 4,229,735 A * | 10/1980 | Houck | ........................ | 340/676 |
| 4,436,198 A * | 3/1984 | Houck et al. | ........... | 198/810.02 |
| 4,437,563 A * | 3/1984 | Oriol | ..................... | 198/810.02 |
| 4,447,807 A * | 5/1984 | Klein et al. | ............. | 198/810.02 |
| 4,463,434 A * | 7/1984 | Haylett et al. | .......... | 198/810.02 |
| 4,464,654 A | 8/1984 | Klein | ......................... | 340/676 |
| 4,470,120 A * | 9/1984 | Haylett | .................. | 198/810.02 |
| 4,541,063 A * | 9/1985 | Doljack | ................. | 198/810.02 |
| 4,621,727 A * | 11/1986 | Strader | .................. | 198/810.02 |
| 4,854,446 A | 8/1989 | Strader | ....................... | 198/810 |

(Continued)

OTHER PUBLICATIONS

European Search Report, completed Jan. 12, 2007.

*Primary Examiner*—Gene Crawford
*Assistant Examiner*—William R Harp

(57) ABSTRACT

A self-synchronizing system and method for conveyor belt sensor operation is disclosed based on the address of an RFID tag in the belt and the location of that tag in the system memory. A moving conveyor belt system has a plurality of sensors spaced along the belt and a sensor reader for detecting and identifying the presence of a sensor passing by the sensor reader. The belt further includes a plurality of identification tags spaced along the belt and a tag reader for detecting and identifying the presence of a tag passing by the tag reader. Associated time and distance target values are acquired from a calibration table for a next sensor (S1) based upon a detected and identified functional tag. Time and distance counters are initiated. The conveyor belt may be stopped in the event that the next sensor (S1) is not detected before the time and distance target values are exceeded.

4 Claims, 7 Drawing Sheets

U.S. PATENT DOCUMENTS

| | | | |
|---|---|---|---|
| 5,168,266 A * | 12/1992 | Fukuda | 340/676 |
| 6,047,814 A * | 4/2000 | Alles et al. | 198/810.02 |
| 6,264,577 B1 * | 7/2001 | Hutchins | 474/106 |
| 6,352,149 B1 | 3/2002 | Gartland | 198/810.02 |
| 6,581,755 B1 * | 6/2003 | Wilke et al. | 198/810.03 |
| 6,591,375 B1 * | 7/2003 | Hu | 714/25 |
| 6,715,602 B1 | 4/2004 | Gartland | 198/810.02 |
| 6,781,515 B2 * | 8/2004 | Kuzik et al. | 340/676 |
| 6,988,610 B2 * | 1/2006 | Fromme et al. | 198/502.1 |
| 7,275,637 B2 * | 10/2007 | Brown | 198/810.02 |
| 2002/0145529 A1 * | 10/2002 | Kuzik et al. | 340/676 |
| 2004/0149049 A1 | 8/2004 | Kuzik et al. | 73/862.453 |
| 2006/0180440 A1 * | 8/2006 | Lewis et al. | 198/810.03 |
| 2007/0052540 A1 * | 3/2007 | Hall et al. | 340/572.1 |

* cited by examiner

METHOD FOR SELF-SYNCHRONIZING A CONVEYOR BELT SENSOR SYSTEM

FIELD OF THE INVENTION

The invention relates generally to conveyor belts having electrically conductive sensors incorporated therein to sense belt degradation and, more particularly, to a method for synchronizing conveyor belt sensor detection in order to minimize detection errors.

BACKGROUND OF THE INVENTION

In a multitude of commercial applications, it is common to employ a heavy duty conveyor belt for the purpose of transporting product and material. The belts so employed may be relatively long, on the order of miles, and represent a high cost component of an industrial material handling operation. In many applications, the belts are susceptible to damage from the material transported thereby and a rip (slit, cut or tear) may develop within the belt. A torn or ripped belt can be repaired once detected. The cost of repairing a heavy duty conveyor belt and the cost of cleaning up material spilled from the damaged belt can be substantial. If, however, such a rip or tear commences and the belt is not immediately stopped, the rip can propagate for a substantial distance along the belt. It is, therefore, desirable to detect and locate a rip in the belt as quickly as possible after it commences and to immediately terminate belt operation, whereby minimizing the extent of the damage to the belt.

It is well known to employ sensors within conveyor belts as part of a rip detection system. In a typical system, sensors in the form of loops of conductive wire are affixed or embedded in the belt and provide a rip detection utility as part of an overall rip detection system. Rip detection is achieved through the inferential detection of an "open circuit" condition in one or more of the sensor loops in the belt. Typically an electrical energy source external to the belt is inductively or capacitively coupled to a sensor loop in the belt. A break in the conductive wire loop of the sensor may be detected by a remote transmitter/receiver (exciter/detector). Disposition of a plurality of such sensors at intervals along the conveyor may be effected with each sensor passing within read range of one or more exciter/detectors at various locations. A rip or tear will encounter and damage a proximal sensor loop and the existence of the tear will be detected when the proximal sensor loop damage is detected as an open circuit by the reader at its next pass. In this manner, the existence of a tear will be promptly detected and repaired and damage to the belt therefrom minimized.

U.S. Pat. No. 3,742,477 (Enabnit; 1973) discloses a "figure eight" sensor loop useful within belt sensor system. U.S. Pat. No. 4,854,446 (Strader; 1989) teaches a "figure eight" sensor loops disposed at intervals along a conveyor belt. U.S. Pat. No. 6,352,149 (Gartland, 2002) provides a system in which antennae are embedded in a conveyor belt to couple with an electromagnetic circuit consisting of two detector heads and an electronic package. Coupling occurs only when an antenna passes across the detector heads and can only occur when the loop integrity has not been compromised.

U.S. Pat. No. 6,715,602 discloses a sensor system in which sensors are embedded at predetermined intervals along a conveyor belt. A detector detects the presence or the absence of a sensor and that information is used to evaluate the condition of the belt at the sensor location. While the system works well, certain data interpretation problems exist. The RFID tags used in the belt and the information they provide are not reliable for use in drawing critical conclusions. If the tags are not read, the system is configured to shut the belt down. Such a disruption may or may not be necessary given the location of the tag in the belt and whether the failure to detect the tag should be interpreted as a belt failure.

It is, therefore, important that the system not shutdown automatically if the tag(s) are not detected. In addition, it is desired that the reading of sensors along the belt be synchronized in a reliable manner that minimizes the possibility of faulty identification of sensor location or faulty detection of sensor malfunction. This is important as the conveyor system ages and sensor operation becomes intermittent. Intermittent sensors can result in a contradiction between the memory map in the system and the actual position of a detected sensor in the belt. The system may find itself looking for a different embedded sensor in its memory than the actual sensor that is passing by the detector head(s). As a result, the detection system and memory map may become contradictory and unreliable.

It is, accordingly, a remaining need in the industry for a conveyor belt sensor system and method that can correlate exact belt position to the stored data within the sensor system (memory map). Such a system and method should be compatible for use in a wide range of available sensor systems for conveyor belts. The method and system, moreover, should be dependable and facilitate a reliable location of intermittent or non-functioning sensors in a belt. Moreover, a suitable method and system will dependably synchronize location of the belt with a memory map so as to minimize the possibility of erroneous sensor location identification.

SUMMARY OF THE INVENTION

A self-synchronizing system and method for conveyor belt sensor operation is disclosed based on the address of an RFID tag in the belt and the location of that tag in the system memory. A moving conveyor belt system has a plurality of sensors spaced along the belt and a sensor reader for detecting and identifying the presence of a sensor passing by the sensor reader. The belt further includes a plurality of identification tags spaced along the belt and a tag reader for detecting and identifying the presence of a tag passing by the tag reader. Pursuant to one aspect of the invention, a method for synchronizing identification of sensors with movement of the belt includes: acquiring associated time and distance target values from a calibration table for a next sensor (S1) based upon a detected and identified functional tag; initiating time and distance counters; determining whether the next sensor (S1) is detected within the time and distance target values. The conveyor belt may be stopped in the event that the sensor (S1) is detected after the time and distance target values are exceeded.

Pursuant to another aspect of the invention, the above method may include acquiring associated time and distance target values for a second sensor (S2) in the event that the sensor (S1) is detected and identified within the time and distance target values.

According to a further aspect of the invention, a self-synchronizing sensor system for a moving conveyor belt is provided. The belt has a plurality of sensors spaced along the belt and a sensor reader for detecting and identifying the presence of a sensor passing by the sensor reader. The self-synchronizing system includes a plurality of identification tags spaced along the belt; a tag reader for detecting and identifying the presence of a tag passing by the tag reader; means for acquiring associated time and distance target values from a calibration table for a next sensor (S1) based upon detection and identification of a functioning tag; means for initiating time and distance counters; means for determining whether the next sensor (S1) is detected within the time and distance target values; and means for stopping the conveyor belt in the event that the sensor (S1) is detected after the time and distance target values are exceeded.

BRIEF DESCRIPTION OF THE DRAWINGS

The invention will be described by way of example and with reference to the accompanying drawings in which.

DETAILED DESCRIPTION OF THE INVENTION

Figure 1A:
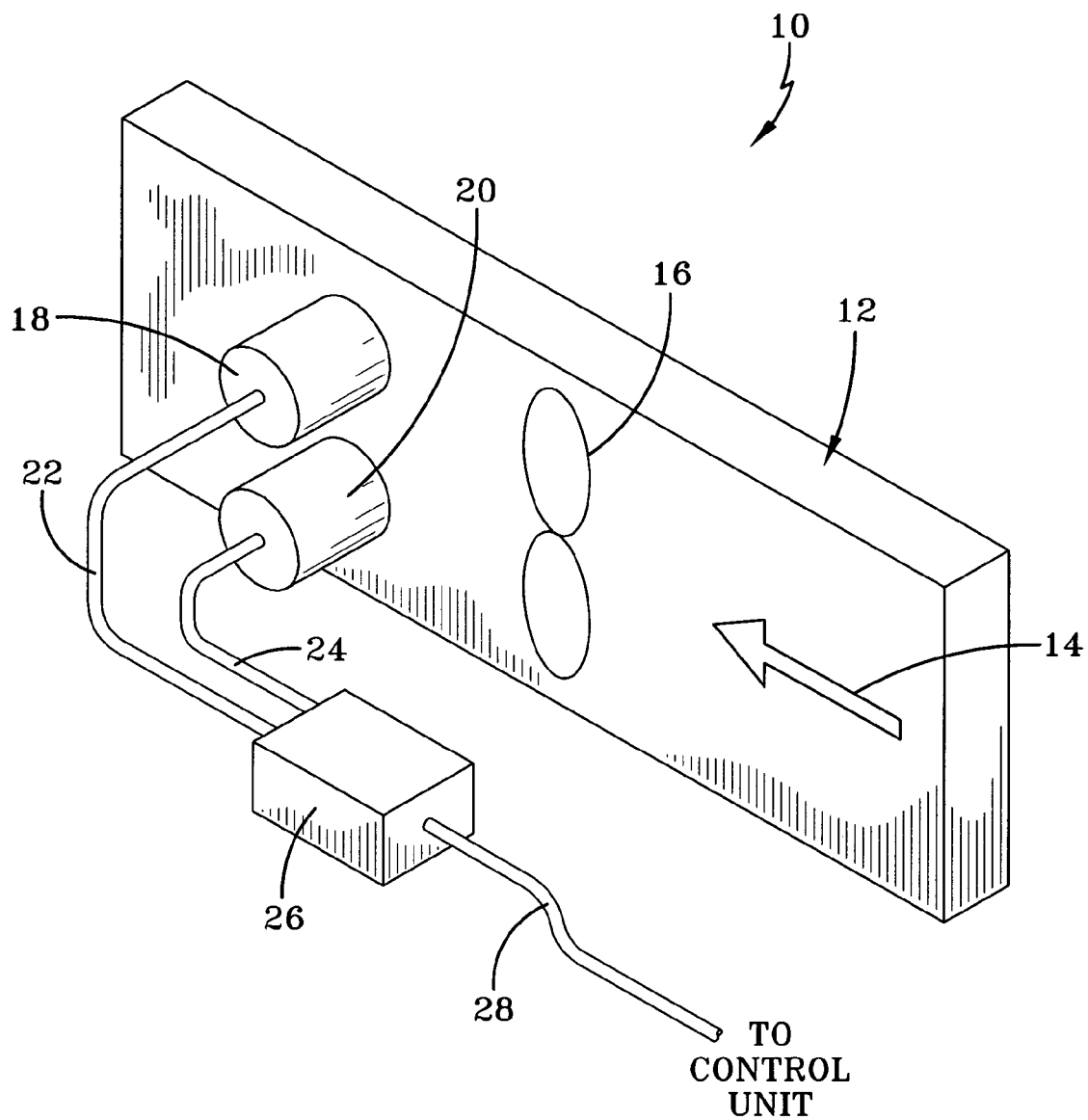
FIG. 1 is a schematic view of a prior art sensor system for a conveyor belt.
Figure 1B:
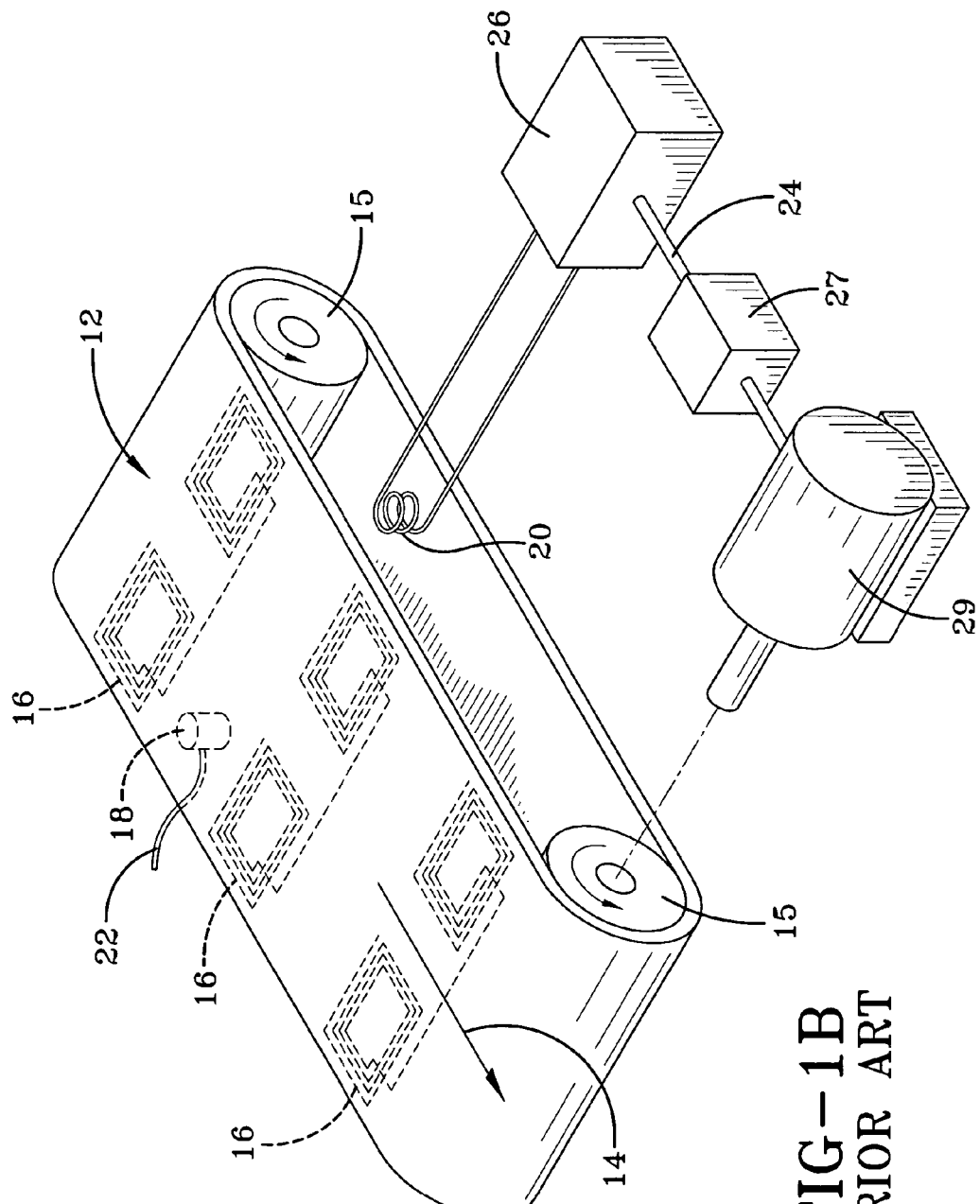

Referring initially to FIGS. 1A and 1B, a prior art conveyor belt rip detection system 10 is shown of the type taught in U.S. Pat. No. 6,352,149, incorporated herein by reference. The system comprises conveyor belt 12 that travels in a direction 14 driven by rollers (or pulleys) 15. A series of spaced apart conductors or sensors 16 are embedded within the conveyor belt 12. Each conductor 16 is formed in an endless loop arranged in a "figure 8" configuration. The sensor is configured for incorporation within the conveyor belt 12 of conventional structure having a top load bearing surface, a middle carcass layer, and a pulley cover. The sensor 16 may be embedded within any of the three layers. The rip detection system includes an external transmitter/exciter 18 and one or more receiver/detectors 20 of a commercially available type. The devices 18, 20 are routed by leads 22, 24, respectively through a junction box 26 to a motor controller 27 via lead 28. Controller 27 controls drive motor 29 that operatively drives the rollers 15. The system sensors 16 are spaced apart from each other and embedded in the elastomeric conveyor belt 12 transverse to the direction of belt travel 14.

The conductors/sensors 16 may use either magnetic or electric fields for excitation/detection. The conductors 16 carry a current flow therein when subjected to an electrical or magnetic field. A rip in the belt 12 will eventually propagate far enough to cause one of the conductors 16 to be broken. The transmitter 18 emits an electrical or magnetic field that is communicated by conductors 16 to a receiver 20 provided the conductor 16 is intact. Receiver 20 provides a signal to control circuitry that processes the signal and indicates a rip. The rip signal may result in an alarm and/or a signal to the motor controller 27 to automatically stop the motor 29 driving the belt 12 and shut down the conveyor belt 12.

A discontinuity in at least one of the sensors 16 will be detected by the detector(s) 20 and the belt 12 stopped. The system represented in FIGS. 1A and 1B protects by using antennae 16 embedded in the belt 12. During normal operation, the two detector heads 20 are mounted equidistant from the edges of the belt such that the largest area of the antenna loops pass over the detector heads as the belt cycles. When the system couples with a passing loop, a resonance peak is generated and the system resets its time or distance counters and associated targets. If a rip occurs in the belt and the integrity of a loop is compromised, the electromagnetic circuit will no longer detect the loop and a stop signal is triggered, limiting the amount of damage to the belt. Separation of the loops 16 in the belt may be monitored in terms of time or distance.

In the time mode the system will wait a given amount of time before it expects to detect a loop. If this set time is exceeded without detecting a loop, the system will trip a relay and shut the belt down. This approach is limited in that it does not correlate to the actual motion of the belt and the degree of protection is highly dependent on the speed of the belt.

In the distance mode, there are two options: standard distance and pattern distance. The standard distance mode is not dependent on the speed of the belt but rather utilizes a proximity sensor or encoder to determine the position of the loops. The system scans the belt and determines the largest distance separating any two loops in the belt and protects to that distance. With the pattern mode, the system synchronizes on the smallest loop separation during calibration and protects the belt for each subsequent loop separation in order. In this functional mode the system monitors the sensor pattern in the belt in order to protect. A difficulty, however, is encountered when the sensor pattern within the belt is irregular or has been modified by loss of one or more sensors, or a repair of the belt that results in an alteration in the spacing between belt sensor loops.

With regard to prior art systems of the type previously described, several limitations will be apparent. First, the prior art system synchronizes on the smallest gap in the belt in order to determine its location on the belt. The sensor loop locations in the belt and loop signal are not correlated for loop identification, making troubleshooting relatively imprecise. In the prior art system of FIGS. 1A and 1B, the reader is programmed to look for a loop at a certain interval (time or distance). If the belt position changes from slippage or the like, the synchronization between the reader and the loop sensors is inhibited, throwing the system out of sync. In such an event, the system must re-synchronize the reader to the sensor pattern in order to resume its rip monitoring duty. If a belt has been repaired and the pattern of sensor loops within the belt altered, the same problem will arise; that is, the reader will not "know" the sensor pattern within the belt has been modified.

Because a sensor's location within in the belt is not precisely ascertainable when a rip occurs in state of the art systems, a "Stop on Command" is not reliable. The belt must be stopped and physically examined in order to know the precise location of belt damage or an area of interest on the belt. The belt cannot, without a "Stop on Command" capability, be reliably stopped at a position that would be the most convenient from which to effect belt repair or inspection. Additionally, in such state of the art systems the configuration of the loop design is relatively rigid and inflexible. Because existing system use analog signals to ascertain the integrity of the loop, the systems are also vulnerable to misreadings due to extraneous "noise" and/or electromagnetic interference. Moreover, existing systems cannot readily facilitate wear rate monitoring with their sensor configurations and the systems are prone to premature failure from breakage of the sensor loops by stress forces encountered through normal operation of the belt.

Figure 2:
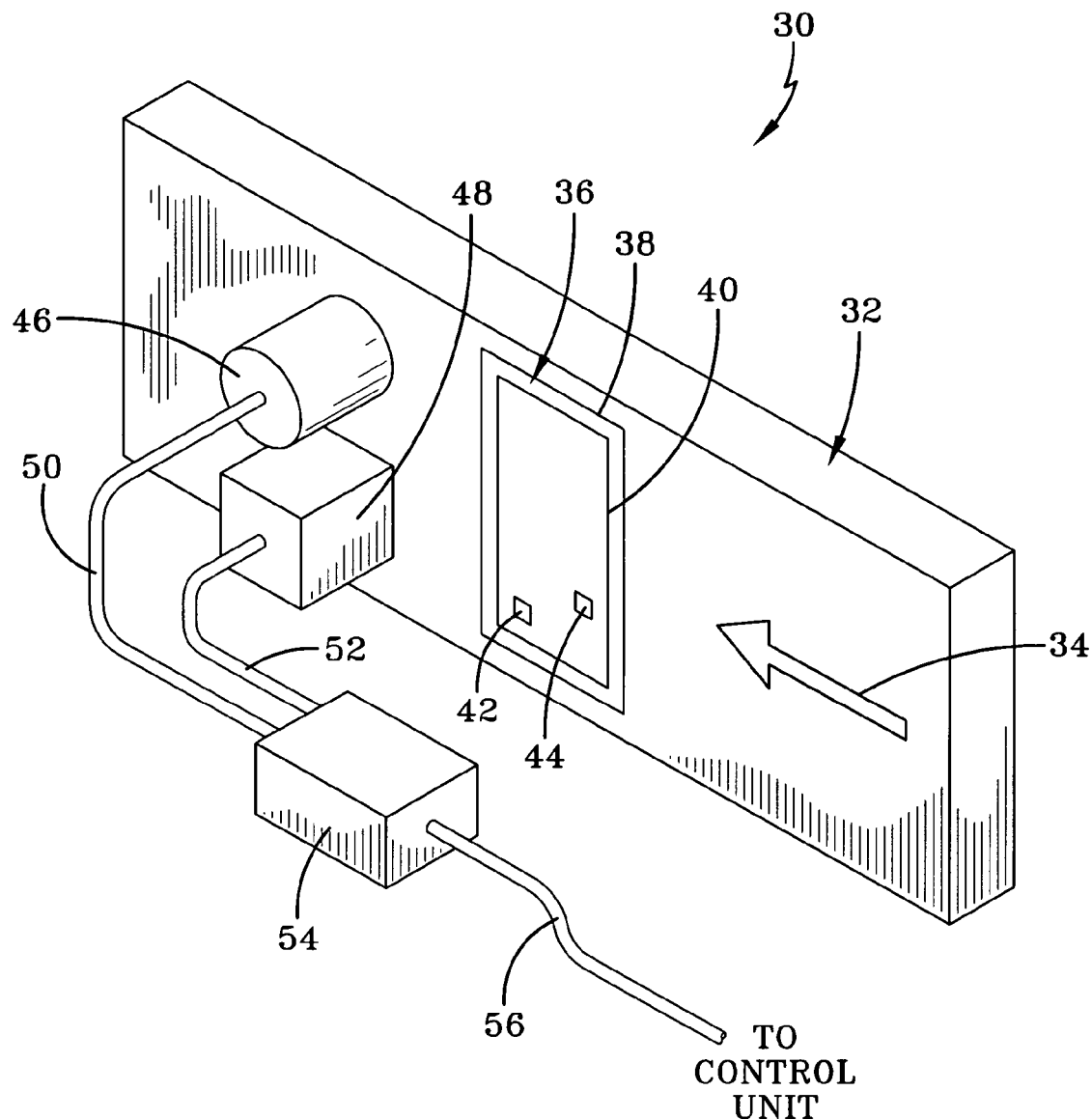
FIG. 2 is a schematic view of an alternatively configured prior art sensor system.

Referring to FIG. 2, a conveyor belt rip detection system 30 is illustrated. The system includes a conveyor belt 32 moveable in the direction indicated at 34 in the manner described above. The motor, motor controller, and roller drive system (not shown) are as shown in U.S. Pat. No. 6,352,149. The system includes a transponder and antenna system 36 that includes a pair of concentric antennae/sensor loops 38, 40 and a pair of ID transponders 42, 44. The transponders 42, 44 are integrated into respective elongate semiconductor chips having an integral coupling coil by which both transponders may be electromagnetically coupled to both the loops 38, 40. In the preferred embodiment, the transponders 42, 44 are located and coupled to opposite longitudinal sides of the loops 38, 40 in mutually offset relationship. The loops 38, 40 are generally rectangular and sized to span the width of the belt. Other loop geometries may be utilized if preferred.

A pair of detectors 46, 48 are mounted adjacent the belt 32 in the positions shown. Detector 46 is disposed over conductor loops 38, 40 at one side of the belt 32 and detector 48 is positioned over the transponders 42,44 at an opposite side of the belt 32. Leads 50, 52 from the detectors 46,48, respectively, input through junction box 54 and feed via lead 56 to a motor control unit (not shown).

The subject transponders 42, 44 operate at a frequency of 13.56 MHz and are commercially available. By example and without limitation a suitable transponder is manufactured by GEMPUS, BP100-13881 Gemenos Cedex, France, and marketed carrying the product code G+Rag Series 200 AR10 10LM. Other commercially available transponders may be substituted. The use of a relatively high frequency allows for the utilization of smaller detector sizes. The transponders shown transmit a 16-bit digital, alphanumeric identification signal when energized by an appropriate field. The transponders 42, 44, as explained previously, are each fabricated into an elongate respective chip having an output coupling coil. The transponders are encoded with an identification code and may be inductively energized by a remote transmitter. The transponders 42, 44 are electromagnetically coupled through their respective output coils to both the loops 38, 40 and induce their respective identification signals into the conductor loops when energized.

A pair of reader/detectors 46, 48 of a type commercially available are provided positioned relative to the loops 38, 40 as shown in FIG. 2. Detectors manufactured and sold by Phase IV Engineering, 2820 Wilderness Place, Unit C, Boulder, Colo. 80301 under the product identification conveyor tag reader are suitable and other known commercially available readers may be substituted if desired. A coupling occurs only when the antenna loops pass across the detector heads and can only occur when the loop integrity has not been compromised. During normal operation, the two detector heads 46, 48 are mounted 1 to 11" from the edges of the belt. The transponders 42, 44 are passive and receive their operating energy from a signal induced into the loops 38, 40 by a remote transmitter (not shown). Once activated, the transponders 42, 44 induce an identification number into both conductor loops 38, 40 which are detected by reader/detector 48. Two transponders and two coupled conductor loops 38, 40 comprise each sensor along the belt in the preferred embodiment for the sake of redundancy. Should such redundancy not be deemed desirable, a series of single transponder to sensor loop coupled pairs may be employed in the practice of the invention.

The second detector head 46 is mounted over the opposite side of the belt and reads loops 38, 40 to determine whether or not the induced identification signal from the transponders 42, 44 is present. If the loop is not intact, the signal will not be carried by the loop and the second sensor head will not detect the signal. A conclusion that the loops 38, 40 have been damaged is thus drawn.

Output from the detectors 46, 48 is relayed via leads 48, 50 through a junction box 54 and output lead 56 to a control unit (not shown). The control system cross-references the identification number provided by transducers 42, 44 to a specific location on the belt. If the loops 38, 40 are not intact, the control unit (such as 27 in FIG. 1B) would shut the belt down via a relay and indicate a "rip stop".

Figure 3:
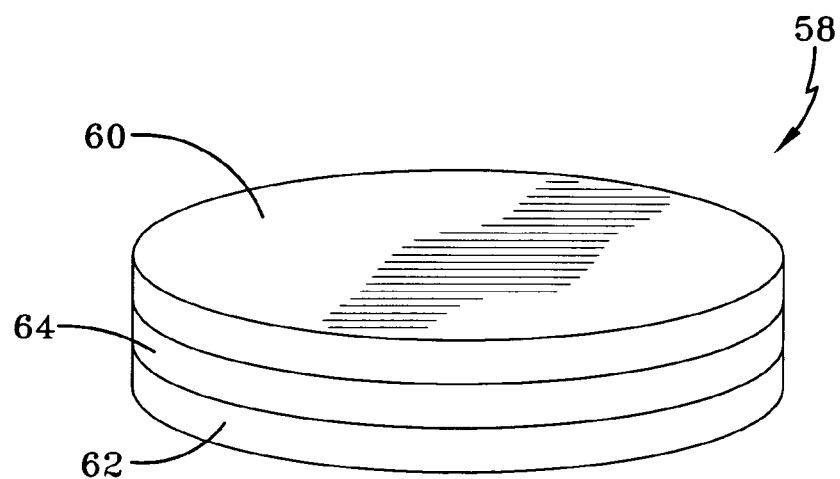
FIG. 3 is a schematic view of a prior art layered transponder package.
Figure 4:
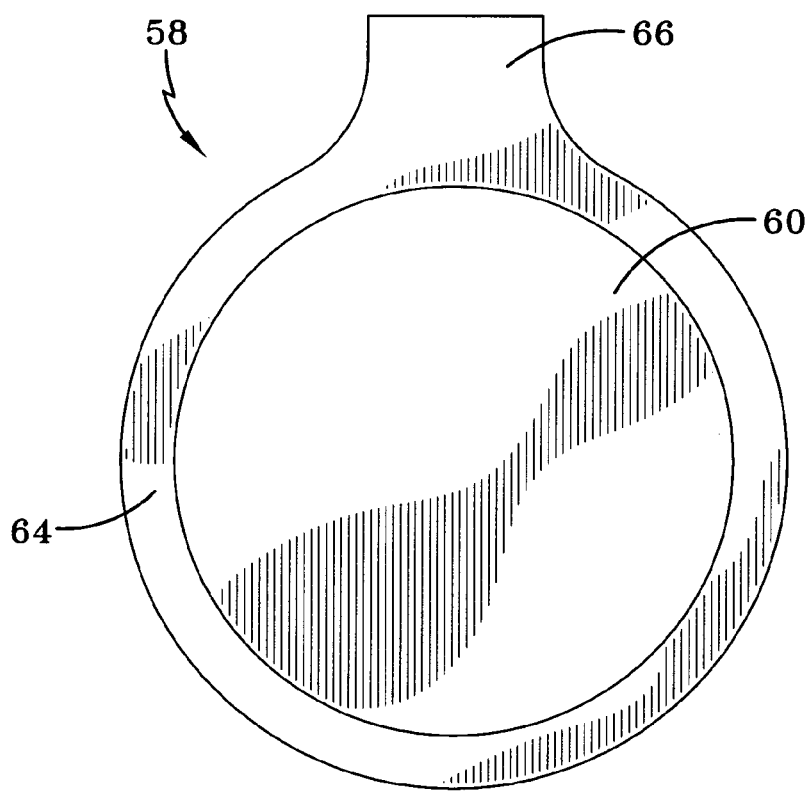
FIG. 4 is a top plan view of the prior art transponder package.

Referring to FIGS. 2, 3, and 4, as discussed previously the transponders 42, 44 may be incorporated into a single integrated chip having an elongate geometry. In the preferred embodiment, the geometry is generally rectangular symmetric about a longitudinal axis. So as to protect the integrity of the chip and chip circuitry components from damage due to normal operation of the belt, the chip is incorporated within a disc shaped, generally circular package 58. A circular package avoids corners that concentrate stresses. In order to form package 58, the transponder chip is embedded within an elastomeric bonding layer 64 that is sandwiched between opposed layers 60, 62 of reinforcing material. In the shown embodiment, the bonding layer 64 is a rubber compound and the layers 60, 62 constitute high temperature fiber glass reinforced material. Other materials known in the industry may be substituted and utilized if so desired. The bonding layer 64 encapsulates the chip therein and bonds with layers 60, 62 to hold the layers in the package formation 58 shown.

As seen from FIG. 4, the composite package 58 consisting of the ID chip embedded between rubber and high temperature fiberglass reinforcement material is further provided with a protrusion 66 at one end. Protrusion 66 is in alignment with the longitudinal axis of the ID chip and provides the means for orienting the chip within the belt 32. Pursuant to one aspect of the invention, it is advantageous to orient the elongate ID chip axis transverse to the direction of belt travel 34 as viewed in FIG. 2. By orienting the longitudinal axis of the transponder chip transverse to the belt direction of travel 34, the shorter chip sides rather than the elongate sides are subjected to bending moments induced into the chip from normal operation of the belt. Because the chip resistance to such bending stress is greater in the shorter, transverse chip direction, there is less risk of damage to the chip when the longitudinal axis of the chip is oriented transverse to the direction of belt travel.

Figure 5:
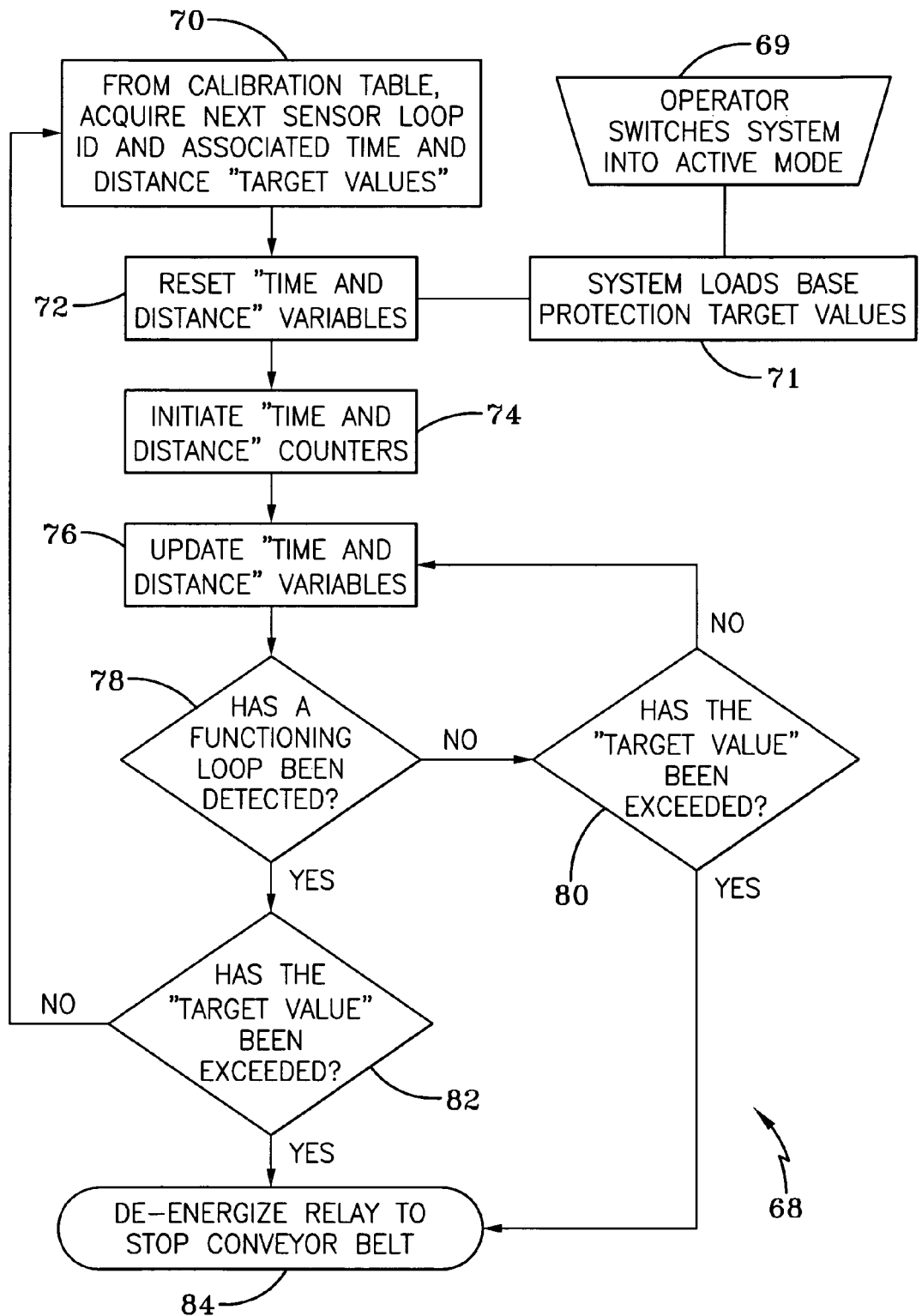
FIG. 5 is a block level diagram of a prior art system.

FIG. 5 presents a schematic 68 of the logic for a prior art system. The precise location of each coupled sensor loop/transponder is known and may be programmed into computer memory.

In the prior art system, an operator switches the system into an Active Mode (69). From a Calibration Table, the next sensor loop ID and associated time and distance "Target Values" are obtained (70). The time and distance variables that determine where the next transponder/sensor loop is determined is reset (72) based upon Base Protection Target Values loaded by the system (71). Time and distance counters are initiated (74) and time and distance variables updated (76). The system will know based upon data stored in memory the identity and estimated location of the next sensor/transponder pair in the belt. The system will transmit an energizing signal to the transponder(s) that will trigger an induction of an identification signal by the transponder into the loop(s). If two transponders and two concentric sensor loops are employed, an identification signal will appear in both sensor loops. Should one of the transponders or loops be damaged, the presence of the signal in the surviving loop will be detected and the system will conclude no breach in belt integrity has occurred. Should both loops/transponders be damaged, however, no signal will be detected and the system will conclude that a breach in belt security has occurred.

The system monitors each sensor loop(s) and decides (78) whether a functioning loop has been detected. If a functioning loop is not detected, the system determines whether the "Target Value" based upon "Time and Distance" has been exceeded (80). In the event the values for time and distance have been exceeded, a de-energizing relay signal to stop the belt (84) is given. If the values have not been exceeded, the loop reverts back to update "Time and Distance" variables (76). When a functioning loop is detected (78) and the target value exceeded (82), the belt is stopped (84). If the loop is detected and the Target Values not exceeded, the process loops back to acquire the next loop ID and associated time and distance "Target Values".

In the prior art system, the belt is stopped whenever there is a failure to excite the RFID tag; there is a malfunction of the RFID tag; or there is a break in a sensor wire. In short, RFID failure, not necessarily a break or failure of the conveyor belt or sensor loop, may cause the detection system to institute a belt stoppage. Such action is not warranted when the only failure is in the RFID tag associated with each sensor loop.

In addition, identification of sensors in the belt using a memory map of the belt sensor locations may not be accurate if certain RFID tags malfunction or operate intermittently. As a conveyor belt ages, it is not uncommon for RFID tags to fail or operate intermittently. In the system of FIG. 5, failure of an RFID tag will cause the system to mis-identify the next appearing, functional sensor, believing the tag to be at a position of the failed tag on the belt, rather than the correct position. When this happens, the identification of belt sensors falls out of synchronization with the memory map that identifies the location of each sensor within the belt. The ability of the system to reliably and accurately locate where a belt breakage has occurred is thus compromised.

Figure 7:
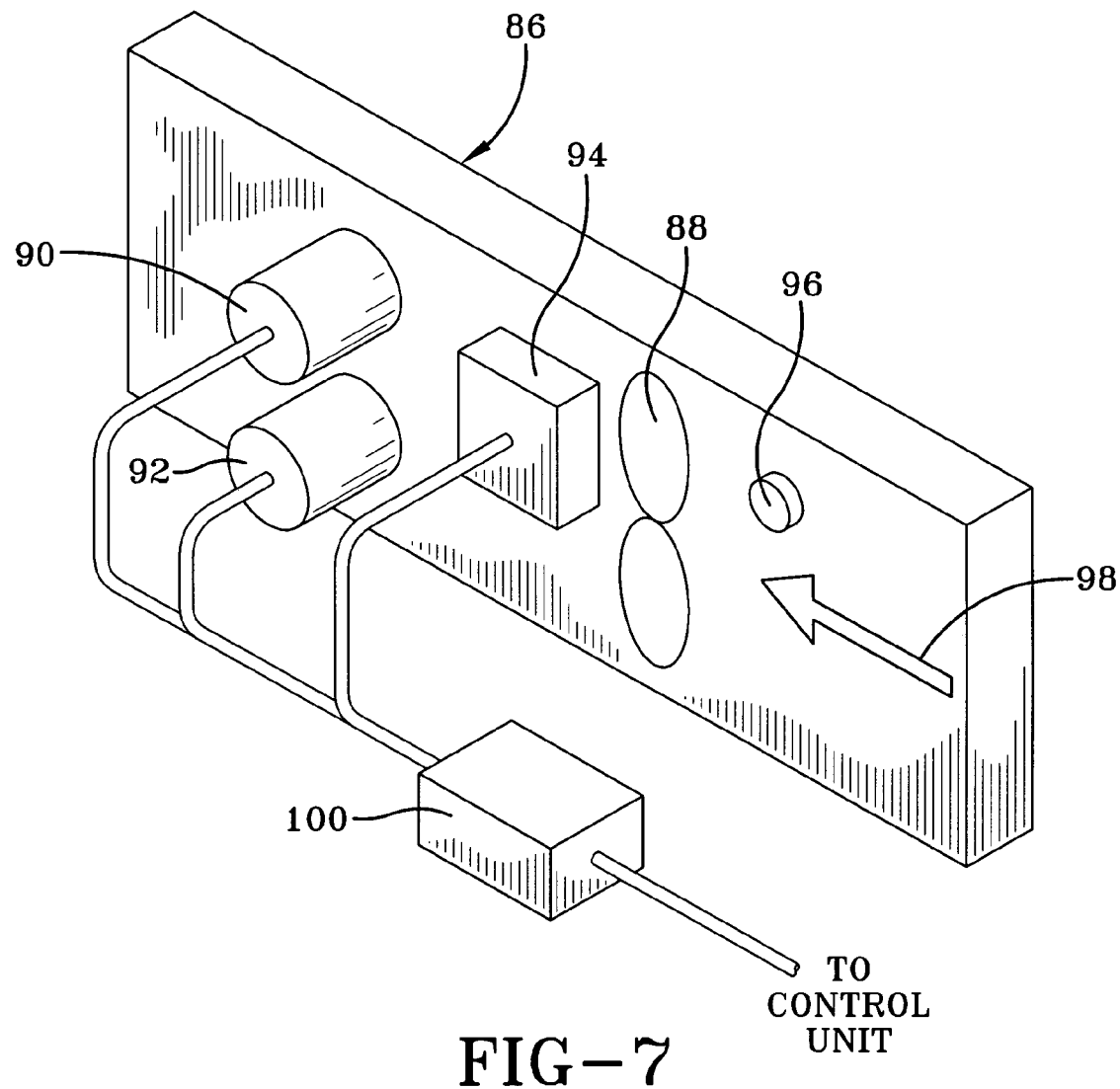
FIG. 7 is a diagram of a conveyor belt and sensor system configured pursuant to the invention.

With reference to FIG. 7, a representative system utilizing the teachings of the invention is shown to include a conveyor belt 86 having a plurality of embedded sensors 88 spaced along the belt 86. While the sensor 88 is shown in the form of a figure eight, the invention is not to be so confined. Other sensor configurations and/or other sensor loop configurations are possible without departing from the invention. The sensor, detector, reader, and tag components may be sourced from the same commercial sources as previously described in reference to the prior art. The sensor 88 functions as described above; namely a rip or tear in the belt at the location of sensor 88 will damage one or both of the loops in sensor 88. Two detector heads 90, 92 are positioned to detect the status of a respective loop in the sensor 88 as the sensor 88 passes proximally to the heads 90, 92. The heads 90, 92 then transmit information concerning the status of sensor 88 to junction box 100 for relay to a processing unit (not shown). A read head 94 is disposed to detect and identify a RFID tag 96 in the belt 86 as the tag 96 passes proximally. The head 94 transmits information concerning the detection and identity of the tag 96 to the junction box 100 for relay to a processing unit.

It will be appreciated that a plurality of the RFID tags 96 is intended to be spaced along the belt 86 at locations maintained in a computer memory map. Likewise, the locations of the sensors 88 are maintained in the computer memory map. The number of tags 96 may, but need not necessarily, equate with the number of sensors 88 and the spacing of the tags 96 may, but need not necessarily, equate with the spacing between the sensors 88 along the belt. A calibration table is stored within system memory whereby the distances between an identified tag and each sensor 88 in the belt may be ascertained. Each tag 96 is thus a synchronizing reference point along the belt. Upon detection and identification of a tag 96 by the reader 94, at a given speed of belt movement in direction 98, associated time and distance "target" values may be acquired by reference to the memory map (calibration table) for each sensor 88 in the belt. That is, the subject system uses the RFID tags as reference addresses in the belt. Locating a tag allows the system to synchronize the belt with the software memory. The system detects and identifies a tag 96 for the sole purpose of generating time and distance target values for sensors 88 in relationship to the detected and identified tag.

Since the spatial relationship of each sensor relative to each tag 96 in the belt is stored in the calibration table, time and distance target values may be acquired from the calibration table using any of the tags 96 as a reference point. A malfunction of one or more tags 96 over time will not affect the capability of the system to physically correlate exact belt position to the stored data within the system memory. Any of the remaining tags may be used to correlate the system memory with the physical belt. On the contrary, current systems rely on the detection of tags in order to conclude that an embedded sensor is in good working condition. Failure of a tag is interpreted by such systems as a failure in the sensor loop. Such systems signal that movement of the belt cease in such instances, perhaps unnecessarily. Unnecessary and costly shutdowns result. In addition, should a tag malfunction in an existing system, the system will interpret the location of the next tag as being the location of the prior malfunctioning tag. The position of the belt relative to the memory map of the system is thereby incorrect and the system cannot recover to reconcile the incongruity between the memory map and actual belt position.

The present invention uses the tags to synchronize the position of the belt with the memory map of the belt in the sensor system. This becomes important when a conveyor system ages and sensors become intermittent. Intermittent sensors can result in the memory map of the belt in the sensor system to differ from the actual position of the belt. The system will find itself looking for a different embedded sensor in its memory than the actual sensor that is passing by the detector heads. The system is thus no longer synchronized. By utilizing the RFID tags as reference locations, the present invention is self-synchronizing based on the address of any RFID tag and the location of that tag in the system memory. The tags thus facilitate locating and replacing intermittent or non-functioning sensors in the belt.

The subject system is self-calibrating. The identification tags, as described below, are spaced along the belt and pass a tag reader which detects and identifies each sensor tag as it passes. The reader detects and identifies the presence of each sensor as it passes the reader and associated sensor separations in time and distance are made. The time and distance counters for individual sensor separation are recorded. This calibration process continues until a repeating pattern of sensor tags is detected and identified. The pattern of tags and sensors within the belt is thus updated and stored in memory each time a self-calibration is made. Missing tags or sensors or damaged tags/sensors that are not detected and identified will be noted. By updating the sensor/tag map of the belt in terms of distance of sensors from each tag, an accurate status of the belt sensor array may be maintained throughout the life of the belt.

In addition, the subject system can operate to automatically skip a sensor in event that a first sensor (S1) is not detected and identified within the time and distance target values. When the "Skip 1" mode is active, associated time and distance target values for a second sensor (S2) is measured from the identified functioning tag in the event that the sensor (S1) is detected and identified within the time and distance target values. In the event that sensor (S1) is not detected and identified within the time and distance target values, however, the system automatically (in the Skip 1 mode) acquires associated time and distance target values for a second sensor (S2) as measured from the identified functioning tag, essentially skipping the non-detected sensor (S1). Thus, the system can continue to use the stored sensor/tag map even as sensors begin to fail during the life of the belt.

Figure 6:
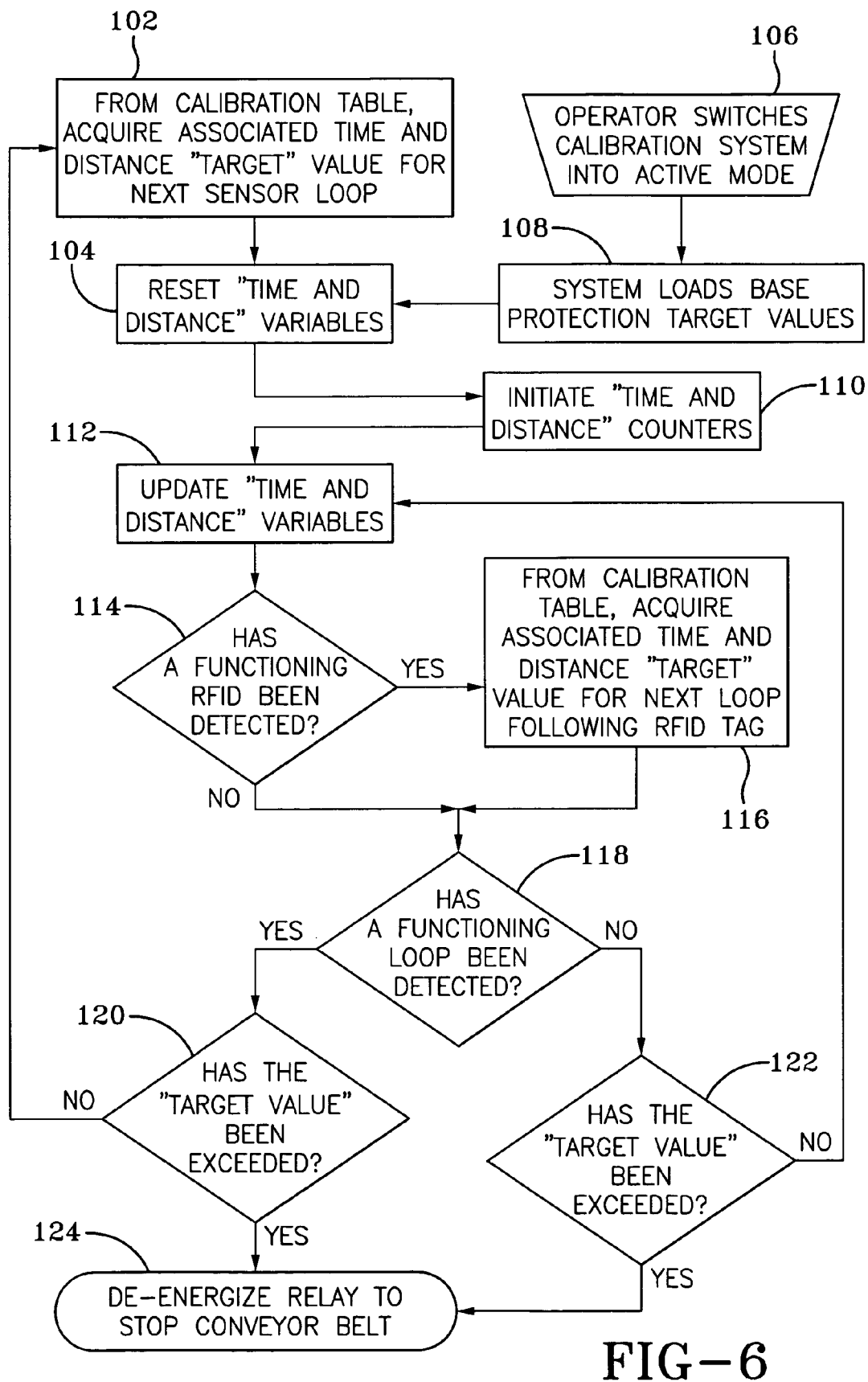
FIG. 6 is a block level diagram of a system configured pursuant to the invention.

FIG. 6 shows in block diagram form the functioning of the subject inventive method. From a calibration table, associated time and distance target values for a next sensor loop (S1) is acquired (102). Time and distance variables are reset (104) and initiated (110) when an operator switches a calibrated system into active mode and the system loads standard distance protection target values (108). The standard distance protection operates until the first tag is detected and the system synchronizes. Pursuant to the method, the system then determines whether a functioning RFID tag has been detected (114). If so, from the system calibration table (memory map), associated time and distance target values are acquired for the next sensor following the RFID tag, using the RFID tag as a reference point (116). The system then determines whether a functioning sensor has been detected (118). If so, a determination is made as to whether the sensor has been detected within the target values (120) and the system loops back to acquire associated time and distance target values for the next sensor loop (S2). The process is thereupon repeated. Should the target values for S1 be exceeded at 120, a relay command to stop the conveyor belt is given (124).

In the event that a functioning sensor S1 is not detected (118), a determination is made as to whether the target time and distance values have been exceeded (122). If they have not, the system feeds back to update time and distance variables (112). If the time and distance values are exceeded, the system again will issue a signal to stop the conveyor belt (124). Note that the non-detection of a functioning RFID tag (114) will not automatically result in a shutdown of the conveyor line. Rather, the system will continue to measure time and distance from the previous reference tag to determine whether subsequent functioning loop sensors are present within the time and distance target values. In addition, the conveyor will only be stopped if the time and distance target values from the reference RFID tag location are exceeded (120, 122). Thus, the system can use each RFID tag as a reference location on the belt in addition to the incoming sensor loop detection, for the purpose of acquiring the correct time and distance target values, until replaced by the next loop or functioning RFID tag.

It is to be noted that the subject system is self-calibrating. That is, the addition of the RFID tags allow the system to self-calibrate based on the repeat of the RFID pattern previously entered in the number of loops. The invention method allows for less nuisance shutdowns in belts that are aging, while maintaining a higher level of protection than prior art systems that rely on a pattern/distance mode of monitoring a belt.

A cycle counter may be employed whereby the user can monitor the system for a pulse after the belt has passed a predetermined target value.

The present invention is not constrained to sensors of a specific configuration or orientation or to the use of tags operating on radio frequency. Other sensor or tag configurations may be employed if desired without departing from the invention.

Variations in the present invention are possible in light of the description of it provided herein. While certain representative embodiments and details have been shown for the purpose of illustrating the subject invention, it will be apparent to those skilled in this art that various changes and modifications can be made therein without departing from the scope of the subject invention. It is, therefore, to be understood that changes can be made in the particular embodiments described which will be within the full intended scope of the invention as defined by the following appended claims.

What is claimed is:

1. A method for synchronizing sensor detection in a moving conveyor belt system of the system type having a plurality of sensors spaced along the belt and a sensor reader for detecting and identifying the presence of a sensor passing by the sensor reader, and a plurality of identification tags spaced along the belt and a tag reader for detecting and identifying the presence of a tag passing by the tag reader, the sensor reader configured for detecting and identifying the presence of a sensor independent of the functionality of an identification tag, and a control unit for recording and monitoring time and distance data, the method comprising:

calibrating the system by determining associated sensor separations in time and distance data relative to each of the identification tags, continuing this process until a repeating pattern of identification tags is detected and identified by the control unit;

acquiring associated time and distance target values from a calibration table for a first sensor (S1) based upon a detected and identified functional tag;

initiating time and distance counters;

determining whether the first sensor (S1) is detected within the time and distance target values, further comprising:

wherein said control unit automatically updates time and distance values in the event that the first sensor (S1) is not detected, based on the next detected functioning tag, thus automatically updating said calibration table.

2. A method according to claim 1, further comprising:
detecting and identifying a functioning tag; and
acquiring associated time and distance target values for a second sensor (S2) from the identified functioning tag in the event that the first sensor (S1) is detected and identified within the time and distance target values.

3. A self-synchronizing sensor system for a moving conveyor belt of the belt type having a plurality of sensors spaced along the belt and a sensor reader for detecting and identifying the presence of a sensor passing by the sensor reader, the system comprising:

a plurality of identification tags spaced along the belt;

a tag reader for detecting and identifying the presence of a tag passing by the tag reader, wherein the sensor reader is configured for detecting and identifying the presence of a sensor independent of the functionality of an identification tag;

a control unit configured for determining associated sensor separations in time and distance data relative to each of the identification tags during calibration of the system; acquiring associated time and distance target values from a calibration table for a first sensor (S1); initiating time and distance counters; determining whether the first sensor (S1) is detected within the time and distance target values; and stopping the conveyor belt in the event that the first sensor (S1) is detected after the time and distance target values are exceeded; and, wherein the control unit is further configured for detecting and identifying a functioning tag; and acquiring associated time and distance target values for a second sensor (S2) as measured from the identified functioning tag in the event that the first sensor (S1) is not detected and identified within the time and distance target values.

4. A self-synchronizing sensor system for a moving conveyor belt of the belt type having a plurality of sensors spaced along the belt and a sensor reader for detecting and identifying the presence of a sensor passing by the sensor reader, the system comprising:

a plurality of identification tags spaced along the belt;

a tag reader for detecting and identifying the presence of a tag passing by the tag reader, wherein the sensor reader is configured for detecting and identifying the presence of a sensor independent of the functionality of an identification tag;

a control unit configured for determining associated sensor separations in time and distance data relative to each of the identification tags during calibration of the system; acquiring associated time and distance target values from a calibration table for a first sensor (S1); initiating time and distance counters; determining whether the first sensor (S1) is detected within the time and distance target values; and stopping the conveyor belt in the event that the first sensor (S1) is detected after the time and distance target values are exceeded; and, wherein the control unit is further configured for detecting and identifying a functioning tag; acquiring associated time and distance target values for a second sensor (S2) as measured from the identified functioning tag in the event that the first sensor (S1) is detected and identified within the time and distance target values; and acquiring associated time and distance target values for a second sensor (S2) as measured from the identified functioning tag in the event that the first sensor (S1) is not detected and identified within the time and distance target values without stopping the belt when the control unit is set to skip one non-functioning sensor.

* * * * *